United States Patent
Cheslow

(10) Patent No.: US 7,627,589 B2
(45) Date of Patent: Dec. 1, 2009

(54) HIGH PERFORMANCE XML STORAGE RETRIEVAL SYSTEM AND METHOD

(75) Inventor: Robert D. Cheslow, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 432 days.

(21) Appl. No.: 10/915,529

(22) Filed: Aug. 10, 2004

(65) Prior Publication Data

US 2006/0036631 A1    Feb. 16, 2006

(51) Int. Cl.
G06F 17/00    (2006.01)

(52) U.S. Cl. ........................... 707/101; 707/100

(58) Field of Classification Search ............... 707/100, 707/101, 202–204; 713/165, 200; 715/513; 717/113

See application file for complete search history.

(56) References Cited

U.S. PATENT DOCUMENTS

| | | | |
|---|---|---|---|
| 6,470,306 B1 * | 10/2002 | Pringle et al. ............... 704/3 |
| 6,654,734 B1 * | 11/2003 | Mani et al. ................. 707/2 |
| 6,718,371 B1 * | 4/2004 | Lowry et al. ............... 709/213 |
| 7,007,105 B1 * | 2/2006 | Sullivan et al. ............ 709/247 |
| 7,158,990 B1 * | 1/2007 | Guo et al. .................. 707/102 |
| 7,260,580 B2 * | 8/2007 | Gauweiler et al. ......... 707/101 |
| 2001/0049679 A1 * | 12/2001 | Yonaitis ...................... 707/4 |
| 2002/0169788 A1 | 11/2002 | Lee et al. ................ 707/104.1 |
| 2003/0046317 A1 * | 3/2003 | Cseri et al. ................. 707/513 |
| 2004/0028049 A1 * | 2/2004 | Wan ............................ 370/394 |
| 2004/0060006 A1 | 3/2004 | Lindblad et al. |
| 2004/0143791 A1 * | 7/2004 | Ito et al. .................... 715/513 |
| 2004/0225998 A1 * | 11/2004 | Van De Vanter et al. ... 717/113 |
| 2005/0044398 A1 * | 2/2005 | Ballinger et al. ........... 713/200 |
| 2005/0097513 A1 * | 5/2005 | Pepper et al. .............. 717/114 |
| 2005/0114763 A1 * | 5/2005 | Nonomura et al. ......... 715/513 |
| 2005/0144556 A1 * | 6/2005 | Petersen et al. ............ 715/513 |
| 2005/0171970 A1 * | 8/2005 | Ozzie et al. ................ 707/102 |
| 2005/0278616 A1 * | 12/2005 | Eller .......................... 715/513 |

OTHER PUBLICATIONS

Bohannon et al., From XML Schema to Relations: A Cost-Based Approach to XML Storage, Feb. 26-Mar. 1, 2002, IEEE, pp. 64-75.*
Bayardo et al., An Evaluation of Binary XML Encoding Optimizations for Fast Stream Based XML Processing, May 2004, ACM, pp. 345-354.*
Niedermeier et al., An MPEG-7 Tool for Compression and Streaming of XML data, Aug. 26-29, 2002, IEEE, vol. 1, pp. 521-524.*

(Continued)

Primary Examiner—Apu M Mofiz
Assistant Examiner—Jessica N Le
(74) Attorney, Agent, or Firm—Patrick J. Inouye; Scott E. Smith

(57) ABSTRACT

A binary object XML repository for storage and retrieval of data in XML documents includes import manager capabilities for converting file formats to XML. Indexing capabilities encode XML document data in a binary data structure for storage within lexicon(s) in the form of tokens and token types, with a token including data elements corresponding to XML syntax. The lexicon(s) also assigns token identifier numbers, which sequence module(s) store in an original sequence. Postings module(s) map the token identifier numbers to the token identifier's position in the original sequence.

19 Claims, 4 Drawing Sheets

OTHER PUBLICATIONS

Warnill, Chung et al, "An Extension of Xquery for Moving Objects over GML", Information Technology: Coding and Computing, 2004, Proceedings. ITCC 2004, International Conference on Las Vegas, NV, USA, Apr. 5-7, 2004, Piscataway, NJ, USA, IEEE, vol. 2, Apr. 5, 2004, pp. 142-147.

Ji-Hoon Kang et al., "An Xquery Engine for Digital Library Systems that support XML date", Applications and the Internet Workshops, 2004. Saint 2004 Workshops, 2004, International Symposium on Jan. 26-30, 2004, Piscataway, NJ, USA, IEEE, Jan. 26, 2004, pp. 233-237.

* cited by examiner

HIGH PERFORMANCE XML STORAGE RETRIEVAL SYSTEM AND METHOD

CROSS REFERENCE TO RELATED APPLICATIONS

The following copending applications, U.S. application Ser. No. 10/914,877, filed Aug. 10, 2004, titled "Extension of XQuery in a High Performance XML/XQuery Database", U.S. application Ser. No. 10/914,903, filed Aug. 10, 2004, titled "Full-Text Search Integration in XML Database", U.S. application Ser. No. 10/914,876, filed Aug. 10, 2004, titled "Integrated Support in an XML/XQuery Database for Web-based Applications", are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 6,654,734 ("System and Method for Query Processing and Optimization for XML Repositories"); U.S. Pat. No. 6,718,371 ("XML-Based Integrated Services Framework"); and U.S. Pat. Appl. Pub. No. 2002/0169788 ("System and Method for Automatic Loading of an XML Document Defined by a Document-Type Definition into a Relational Database Including the Generation of a Relational Schema Therefor").

BACKGROUND

This disclosure relates generally to a computer software system and associated method for storage and retrieval of data in XML documents, and more particularly to a data structure for encoding XML data with tokens and identifier sequences.

Extensible Markup Language (XML) is a programming language operating as an extension to HTML and providing enhanced control of content. It may be used to define the content of a document (such as a Web page) rather than the presentation of it or to exchange information and documents between diverse systems. XML is text-based and formats data by using document tags to catalog information. Key elements in a document may be categorized according to meaning, enabling a search engine to scan an entire document for the XML tags that identify individual pieces of text and images rather than selecting a document by the metatags listed in its header.

There are various strategies for storing and managing XML documents. In XML repositories based on relational database technology, the XML is stored using a method known as "shredding". In this approach, the markup is broken up and stored in fields of database tables, and XML queries are translated into a relational query language (e.g. SQL, Structured Query Language) that retrieves the values from the database using relational operations, and generates the markup output. Overhead for storage is high, and performance for regeneration of the XML (or "round-tripping" of entire XML documents) is typically low. Other database managers designed specifically for XML utilize indexing schemes to process the markup representation of XML more efficiently.

An example of one approach to querying XML documents is presented in U.S. Pat. No. 6,654,734 to Mani et al. ("System and Method for Query Processing and Optimization for XML Repositories"). The query system of Mani et al. views the data in XML documents as a graph that allows queries on content, structure, inter-document links, and intra-document links. The query language is based on tree pattern match semantics using XML semantics, with features that allow the query system to compute a document type definition for the query language and use it to validate the user query formulation. Query optimization is accomplished using schema-based optimization and index-based optimization. The structure pattern is then converted to a string for storage purposes.

Another approach is described in U.S. patent application Publication No. 2002/0169788 to Lee et al. ("System and Method for Automatic Loading of an XML Document Defined by a Document-Type Definition into a Relational Database Including the Generation of a Relational Schema Therefor"). Under the system of Lee et al., a relational schema is created out of a DTD, and SML data is loaded into the generated relational schema that adheres to the DTD. Starting with a DTD for an XML document containing data, all of the information in the DTD is captured into metadata tables, and then the metadata tables are queried to generate the relational schema. The data contained in the XML document can then be loaded into the generated relational schema.

However, utilizing relational database management technology for the storage and retrieval of data in large XML document can be inefficient both in time and space. These systems require both an RDBMS and a front-end for inserting and regenerating the XML. It would be desirable to have an XML database manager that can be deployed on user's machines, as well as centralized servers, that would have a small footprint for the executables and a space-efficient storage strategy, as well as a high-performance implementation of a general-purpose XML query language, such as XQuery.

BRIEF SUMMARY

The disclosed embodiments provide examples of improved solutions to the problems noted in the above Background discussion and the art cited therein. There is shown in these examples an improved binary object XML repository for storage and retrieval of data in XML documents. The binary object XML repository includes import manager capabilities for converting file formats to XML. Indexing capabilities encode XML document data in a binary data structure for storage within lexicon(s) in the form of tokens and token types, with a token including data elements corresponding to XML syntax. The lexicon(s) also assigns token identifier numbers, which sequence module(s) store in an original sequence. Postings module(s) map the token identifier numbers to the token identifier's position in the original sequence.

In another embodiment, a method is provided for storage and retrieval of information in a binary object XML repository having an import manager module, an indexer module, a lexicon module, a sequence module, and a postings module. An XML document is imported and the XML data is encoded in a binary data structure. Tokens, including data elements corresponding to XML syntax, and token types are stored and token identifier numbers are assigned. The token identifier numbers are stored in an original sequence. The token identifier numbers are then mapped to the token identifier's position in the original sequence.

In yet another embodiment, an article of manufacture in the form of a computer usable medium having computer readable program code embodied in the medium causes the computer to perform method steps for storage and retrieval of information in a binary object XML repository. The binary object XML repository includes an import manager module, an indexer module, a lexicon module, a sequence module, and a postings module. An XML document is imported and the XML data is encoded in a binary data structure. Tokens, including data elements corresponding to XML syntax, and token types are stored and token identifier numbers are assigned. The token identifier numbers are stored in an original sequence. The token identifier numbers are then mapped to the token identifier's position in the original sequence.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

The system and method for the Binary Object XML Repository (BOXR) described herein are based on a novel approach to storing and processing XML that allows for very high performance and scalability. Rather than maintaining the text markup representation of the XML data, and adding index structures for navigating the textual data as practiced in the art, BOXR encodes the XML data completely in a binary data structure—the original XML markup need not be stored. This data structure can be navigated with greater efficiency, and any portion of the original XML (or the entire document) can be regenerated quickly.

In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate capabilities for the high performance XML storage and retrieval technology. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communications network. In a distributed computing environment, program modules may be located in both local and remote memory storage devices.

Figure 1:
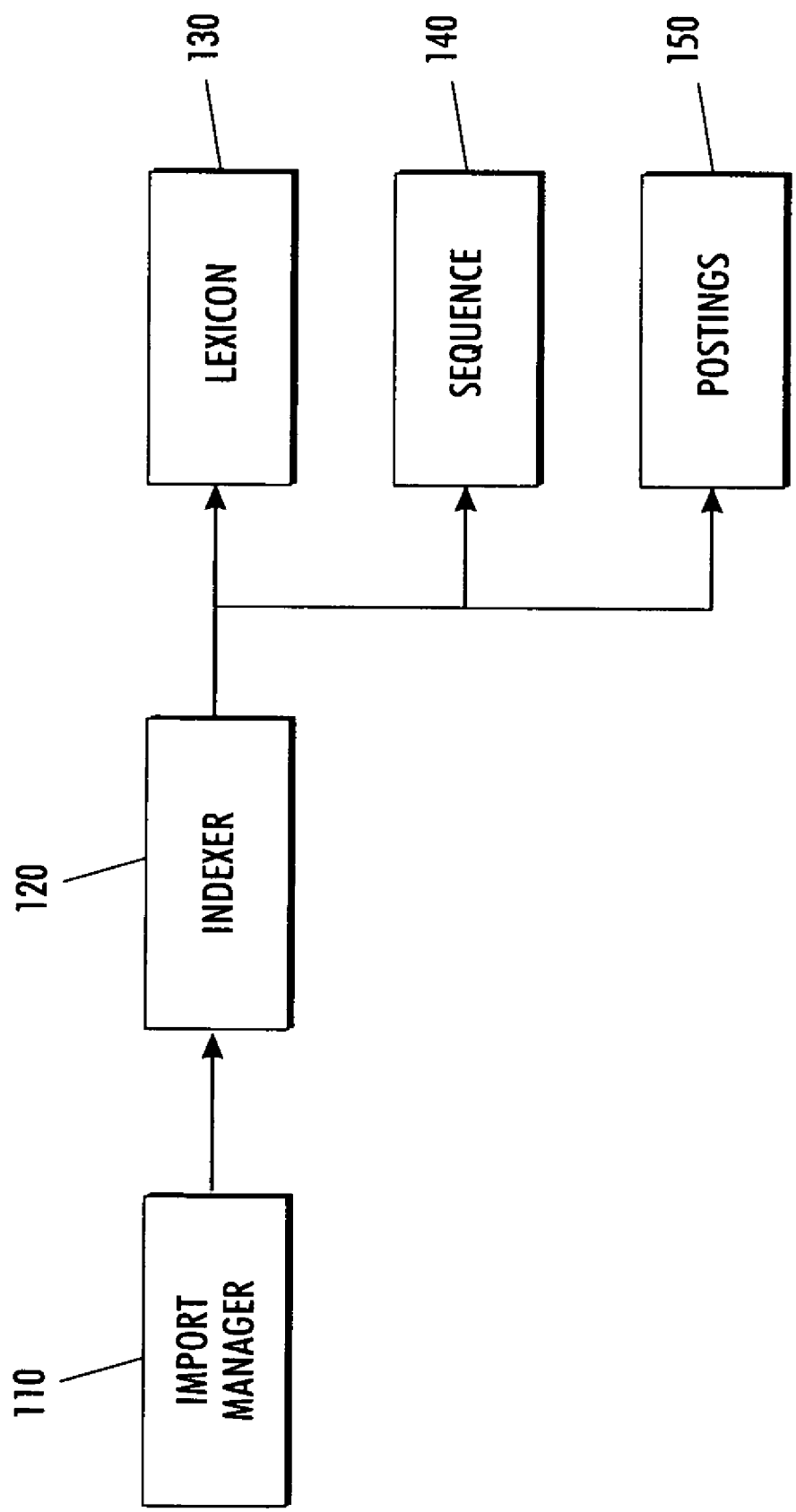
FIG. 1 is a schematic diagram of an example embodiment of the high performance XML storage system.

Turning now to FIG. 1, the storage portion of the storage/retrieval technology is illustrated. Import manager 110 converts various file formats to XML. The conversions are performed by "filters", which are independent modules (shared dynamically linked libraries) that are written to an API specification for BOXR filters. Thus they are "plug-in" modules—they can be added to the system without changing the core engine. BOXR filters have been written for MS Word®, Excel®, PowerPoint®, PDF, HTML, Outlook® and Outlook express EMail, plain text files, and some specially delimited text files. The filters read these file formats, and convert the content to XML, which is returned to BOXR import routines. The filters determine the schema of the converted XML, which may contain structure (e.g. paragraphs for Word, slides/bullets for PowerPoint, etc.) and including metadata associated with each file (e.g. original file name, file size, author, "To" and "From" for mailnotes, etc.).

Indexer 120 streams through the XML documents and stores data. Indexer 120 operates as a tokenizer that breaks the data into pieces corresponding to the XML syntax. Each piece (or "token") is stored in lexicon 130, which assigns a unique integer value to the token that also encodes the associated XML grammar element. For example, "<root id='3'>" would be stored in lexicon 130 as three tokens: "root" as an element name, "id" as an attribute name, and "3" as an attribute value. As the tokens are processed and stored in lexicon 130, the integer values assigned to each one are stored in sequence file 140. Postings module 150 maps the token identifier numbers to the positions of certain data elements in which they occur in the sequence. The original XML markup can then be regenerated by using this sequence of integer values and looking up the associated string and type information for each value from the lexicon.

Figure 2:
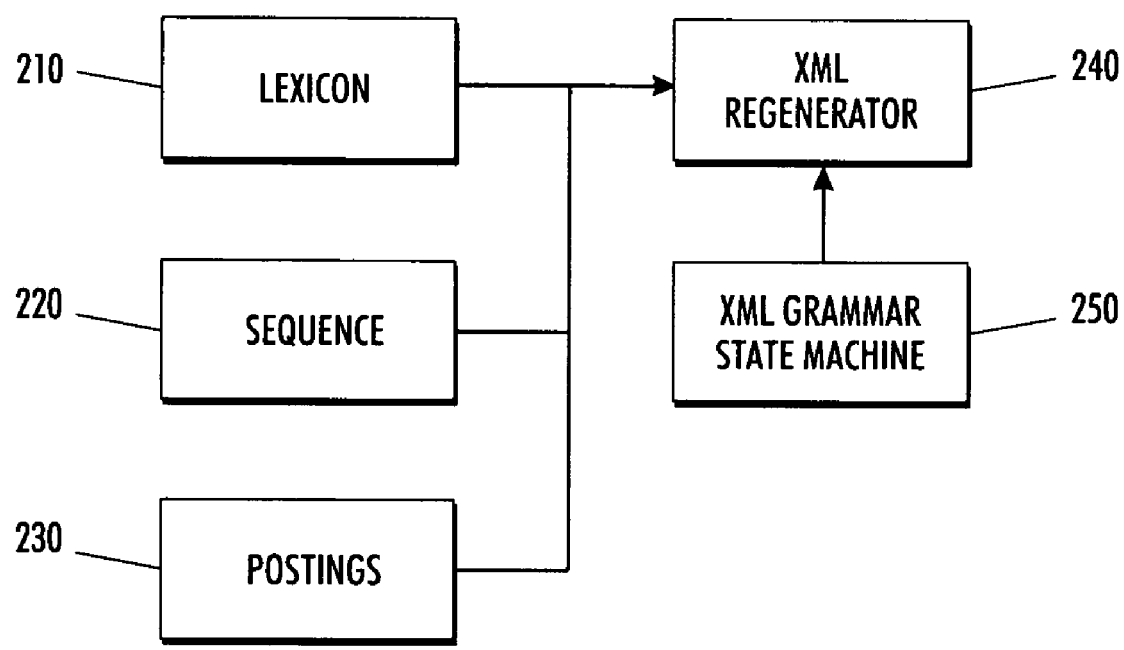
FIG. 2 is a schematic diagram of an example embodiment of the high performance XML retrieval system.

Referring now to FIG. 2, the regeneration portion of the storage/retrieval technology is illustrated. Within lexicon 210 reside the data tokens with their assigned unique integer values and encoded associated XML grammar element. Sequence file 220 includes the integer values assigned to each token. The primary index structures used to accelerate query evaluation are "postings" at 230. Postings files take the list of tokens that occur in a given XML data element and invert the information to map a given token to all data elements in which it occurs. This technique allows an XQuery engine to quickly focus the query interpreter on sections of the XML data that can satisfy a particular query expression. (For the purposes herein, XQuery refers to the specification for a general-purpose XML query language created and endorsed by the W3C standards organization (refer to http://www.w3.org/TR/xquery/). It borrows from previous XML query languages such as XPath, XSL, and Quilt. Developers implement interpreters for the XQuery language using different methods and programming languages.) In addition, postings enable powerful full-text search queries to be integrated into XQuery.

XML regenerator 240 retrieves tokens and formats XML for a given scope in the sequence. Each element in XML begins with a "start tag" and ends with an "end tag" (or "closing tag"). The "scope" of an element is that which is contained between the start and end tags (start tags are enclosed in angle brackets, and end tags are in angle brackets with a forward slash preceding the element name). For example:

<root><data>this is some data</data></root>

In this XML fragment, the scope of the "data" element is the text "this is some data". The scope of the "root" element is <data> this is some data</data>. For each Token ID, the token string is retrieved from the lexicon. The lexicon is in the form of a ternary trie structure that enables efficient storage and retrieval of strings. XML grammar state machine 250 uses token type information to compute syntax for the regenerated XML. Token types include, for example, "Element name in start tag", "Element name in end tag", "Attribute Name", "Attribute Value", and CDATA (text), etc.

XML grammar state machine 250 formats the retrieved token strings into valid XML by keeping track of the token types, which include "Element name in start tag", "Element name in end tag", "Attribute Name", "Attribute Value", and CDATA (text), as examples. Referencing the previously mentioned example, "<root id='3'>, there are three token IDs in the sequence that represent this tag: One for "root" with a token type of "Element name in a start tag", one for "id" with the type "Attribute name", and one for '3' with the type "Attribute value". The grammar state machine adds a left angle bracket before the element name, a space before the attribute name, an equals sign after the attribute name, quotes around the attribute value, and a right angle bracket before the start of the next element or text section, etc., to re-create the original markup. Grammar state machine 250 returns information about what syntax (punctuation) should be added to the regenerated XML. XML regenerator 240 may pass the type information to the state machine.

The advantages of this system include the fact that resolving queries by scanning and comparing encoded integer values is much faster than processing the XML in text. In addition, structures that index into this data to accelerate query evaluation can be represented efficiently by referring to these integer values rather than offsets into a text representation.

Figure 3:
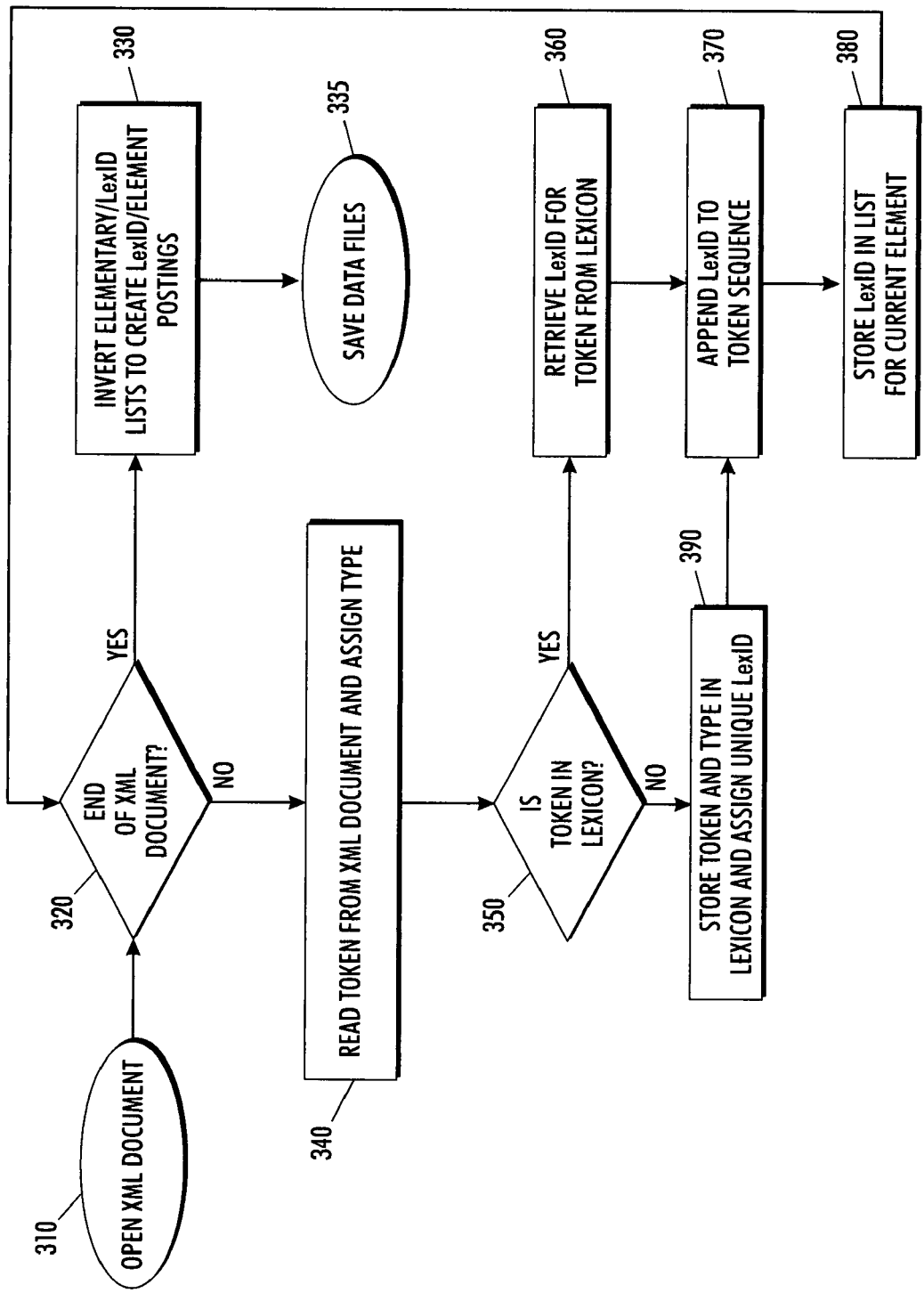
FIG. 3 is a flowchart demonstrating XML data storage according to one embodiment of the XML storage and retrieval technology.

Turning now to FIG. 3, the method for storing XML data in BOXR is illustrated. At 310 the system has been instructed to import and open an XML document. The import process may be initiated in several ways, for example, XQuery functions are built into BOXR that import documents. A determination is made at 320 as to whether the end of the XML document has been reached. The text markup of the XML is parsed, thus identifying the tokens and their types. The end of the XML document is reached when all markup has been processed. If the end of the document has not been reached, at 340 the Token ID is read from the XML document and a type is assigned and stored as part of the Token ID. The type, only one of which is assigned per token, may be in the form of an element, end tag, attribute name, attribute value, CDATA section start, CDATA section end, CDATA token, CDATA whitespace, comment, or XML declaration, as defined by the XML standard (http://www.w3.org/TR/2004/REC-xml-20040204/).

At 350 a determination is made as to whether the token is in the Lexicon module. If the token is included in the Lexicon module, at 360 the software retrieves Token ID for the token from the Lexicon. Token ID is appended to the token sequence at 370 and stored in the list for the current element at 380. If the token is not included in the Lexicon module, the token and type are stored in the Lexicon module and a unique Token ID is assigned at 390. The Token ID is then appended to the token sequence at 370 and stored in the list for the current element at 380. This information is returned to 320 for continued review of the XML document. If the end of the XML document has been reached, the element/Token ID lists are inverted to create Token ID/element postings at 330. While "postings" files are traditionally associated with search engines, the terminology comes from information retrieval technology rather than database technology. "Postings" are also referred to as "inverted files", because they "invert" information: In a search engine, to generate postings, a list of all of the tokens that occur in each document is inverted so that it is possible to look up all of the documents that contain a particular token. In BOXR, this approach is modified, instead of recording the tokens in each "document", BOXR records the tokens in certain XML elements. The choice of which elements to record is either done automatically or can be specified by the database designer. The data files are saved at 335.

Figure 4:
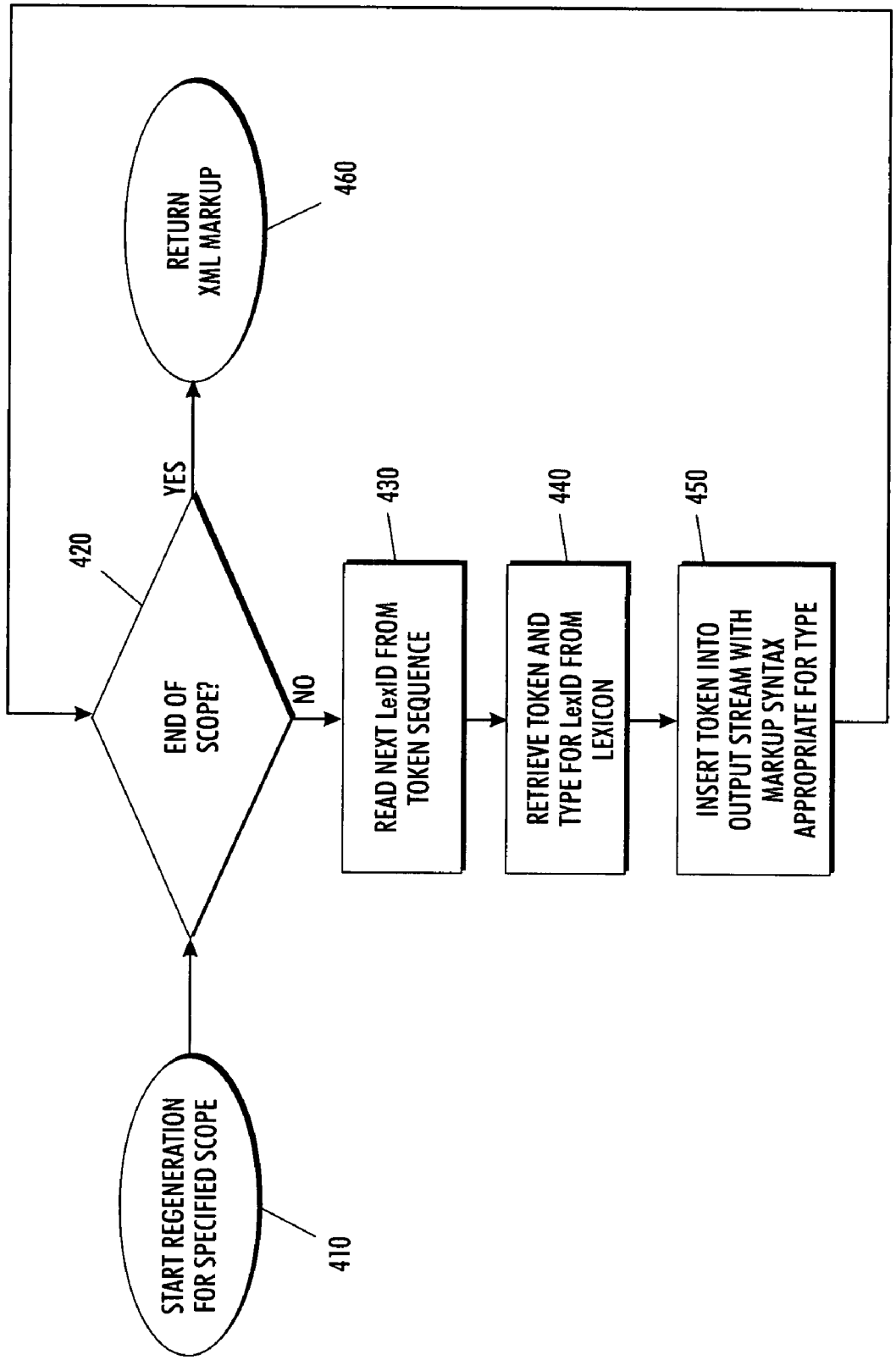
FIG. 4 is a flowchart demonstrating XML data retrieval according to one embodiment of the XML storage and retrieval technology.

Referring to FIG. 4, the method for regenerating XML is illustrated. At 410 regeneration is begun for a specified scope, defined for the purposes herein as an XML fragment defined by a start and an end tag and all properly nested XML enclosed therein, with a "fragment" being a well-formed portion of an XML document. "Well-formed" means adhering to XML syntax and containing an end tag for each start tag, while an XML "document" is a fragment starting with a special XML declaration. At 420 a determination is made as to whether the end of the scope of the XML fragment has been reached. If this is not the case, at 430 the next Token ID is read from the token sequence. The token and type for the Token ID are retrieved from the Lexicon module at 440. The token type is assigned during storage and is stored as part of the Token ID. The token is inserted into the output stream with markup syntax appropriate for the Token ID type at 450 and another check is made at 420 as to completion of scope. If the end of the specified scope has been reached, at 460 the completed XML markup is returned.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer system for storage and retrieval of data in extensible markup language (XML) documents, comprising:
   a memory; and
   a processor operatively coupled to the memory and configured to execute computer executable program modules, including:
      an import manager module configured to convert at least one file format to XML code defined by an XML schema;
      an indexer module configured to encode document data comprised in the XML code defined by the XML schema into a binary data structure, comprising:
         a scoping submodule configured to determine scope within the document data and the scope comprises at least one well-formed fragment of the XML code; and
         a storage submodule configured to store the binary data structure by the scope;

a lexicon module configured to store at least one token and at least one token type and assigning at least one token identifier number, wherein said token includes data elements corresponding to XML syntax and said at least one token type reflects at least one component of XML syntax;

a sequence module configured to store said at least one token identifier number in an original sequence;

a determination module configured to determine whether said token is included in a lexicon;

a token identifier number retrieval module configured to retrieve said token identifier number from said lexicon if said token is included in said lexicon, appending said token identifier number to said original sequence, and storing said token identifier number in the list for the XML data element;

a lexicon storage module configured to store said token and said token type in the lexicon if said token is not included in said lexicon, assigning a unique token identifier to said token, appending said token identifier to the original sequence, and storing said token identifier in the list for the XML data element;

a postings module configured to map said at least one token identifier number to a position of said token identifier number in said original sequence, wherein the postings module further inverts the position information from a list of tokens in an XML data element to map at least one selected token to all the XML data elements in which the selected token appears;

a regenerator module configured to retrieve said at least one token for the scope in said original sequence, comprising:
an insertion submodule configured to insert the at least one token into an output stream for each such well-formed fragment of the XML code; and
a return submodule configured to return completed XML markup upon reading an end of the scope;

a XML grammar state machine module configured to use token type information to compute the XML syntax for regenerating the XML code, comprising:
a reading submodule configured to read the next token identifier number from the original sequence;
a retrieval submodule configured to retrieve the token and token type for a token identifier number from the lexicon; and
a token insertion submodule configured to insert said token into the output stream with the XML markup syntax appropriate for type.

2. The computer system according to claim 1, wherein encoding document data comprised in the XML code into a binary data structure comprises streaming through said XML code and breaking data into pieces corresponding to XML syntax.

3. The computer system according to claim 2, wherein said at least one token type comprises at least one member selected from the group consisting of element, end tag, attribute name, attribute value, CDATA section start, CDATA section end, CDATA token, CDATA whitespace, comment, and XML declaration.

4. The computer system according to claim 1, wherein converting at least one file format to XML code is performed by at least one filter, wherein said at least one filter comprises at least one shared dynamically linked library.

5. The computer system according to claim 1, wherein assigning said at least one token identifier number comprises assigning at least one unique integer value to said at least one token.

6. The computer system according to claim 1, wherein storing at least one token and at least one token type and assigning at least one token identifier number comprises:
reading a token from said XML code and assigning a token type, wherein one type is assigned for each token; and
storing said token as part of the token identifier number.

7. The computer system according to claim 1, wherein the well-formed fragment of the XML code includes an end tag for each start tag.

8. A computer-implemented method for storage and retrieval of data in extensible markup language (XML) documents, comprising:
receiving and converting at least one file format to XML code defined by an XML schema;
encoding XML document data comprised in the XML code defined by the XML schema into a binary data structure, comprising:
determining a scope within the document data and the scope comprises at least one well-formed fragment of the XML code; and
storing the binary data structure by the scope;
storing at least one token and at least one token type and assigning at least one token identifier number, wherein said at least one token includes data elements corresponding to XML syntax and said at least one token type reflects at least one component of XML syntax;
storing said at least one token identifier number in an original sequence;
determining whether said token is included in a lexicon;
retrieving said token identifier number from said lexicon if said token is included in said lexicon, appending said token identifier number to said original sequence, and storing said token identifier number in the list for the XML data element;
storing said token and said token type in the lexicon if said token is not included in said lexicon, assigning a unique token identifier to said token, appending said token identifier to the original sequence, and storing said token identifier in the list for the XML data element;
mapping said at least one token identifier number to a position of said token identifier in said original sequence;
inverting the position information from a list of tokens in an XML data element to map at least one selected token to all the XML data elements in which the selected token appears;
initiating document regeneration for the scope, comprising:
inserting the at least one token into an output stream for each such well-formed fragment of the XML code; and
returning completed XML markup upon reading an end of the scope; and
using token type information to compute the XML syntax for regenerating the XML code, comprising:
reading the next token identifier number from the original sequence;
retrieving the token and token type for a token identifier number from the Lexicon; and
inserting said token into the output stream with the XML syntax appropriate for type.

9. The method according to claim 8, wherein encoding document data comprised in the XML code into a binary data structure comprises parsing the text markup of said XML document to identify at least one token and at least one token type.

10. The method according to claim 8, wherein storing at least one token and at least one token type and assigning at least one token identifier number comprises:

reading a token from said XML code and assigning a token type, wherein one type is assigned for each token; and storing said token as part of the token identifier number.

11. The method according to claim 10, wherein assigning said at least one token identifier number comprises assigning at least one unique integer value to said at least one token.

12. The method according to claim 8, wherein said at least one token type comprises at least one member selected from the group consisting of element, end tag, attribute name, attribute value, CDATA section start, CDATA section end, CDATA token, CDATA whitespace, comment, and XML declaration.

13. The method according to claim 8, wherein converting at least one file format to XML code is performed by at least one filter, wherein said at least one filter comprises at least one shared dynamically linked library.

14. The method according to claim 8, further comprising determining whether a complete document data has been processed.

15. The method according to claim 14, further comprising completing the document processing process when said complete document data has been processed, comprising:

inverting data element and token identifier number lists to create token identifier number and data element postings; and saving the data files.

16. The method according to claim 8, further comprising continuing regeneration processing if said end of scope has not been reached.

17. The method according to claim 8, wherein the well-formed fragment of the XML code includes an end tag for each start tag.

18. A computer-readable storage medium storing computer program code that, when executed by a computer, causes the computer to perform:

converting at least one file format to extensible markup language (XML) code defined by an XML schema;

encoding XML document data comprised in the XML code defined by the XML schema into a binary data structure, comprising:

determining a scope within the document data and the scope comprises at least one well-formed fragment of the XML code; and storing the binary data structure by the scope;

storing at least one token and at least one token type and assigning at least one token identifier number, wherein said at least one token includes data elements corresponding to XML syntax and said at least one token type reflects at least one component of XML syntax;

storing said at least one token identifier number in an original sequence;

determining whether said token is included in a lexicon;

retrieving said token identifier number from said lexicon if said token is included in said lexicon, appending said token identifier number to said original sequence, and storing said token identifier number in the list for the XML data element;

storing said token and said token type in the lexicon if said token is not included in said lexicon, assigning a unique token identifier to said token, appending said token identifier to the original sequence, and storing said token identifier in the list for the XML data element;

mapping said at least one token identifier number to a position of said token identifier in said original sequence;

inverting the position information from a list of tokens in an XML data element to map at least one selected token to all the XML data elements in which the selected token appears;

initiating document regeneration for the scope, comprising:

inserting the at least one token into an output stream for each such well-formed fragment of the XML code; and returning completed XML markup upon reading an end of the scope; and using token type information to compute the XML syntax for regenerating the XML, code, comprising:

reading the next token identifier number from the original sequence;

retrieving the token and token type for a token identifier number from the Lexicon; and inserting said token into the output stream with the XML syntax appropriate for type.

19. The computer-readable storage medium according to claim 18, wherein the well-formed fragment of the XML code includes an end tag for each start tag.

* * * * *